United States Patent Office 3,005,794
Patented Oct. 24, 1961

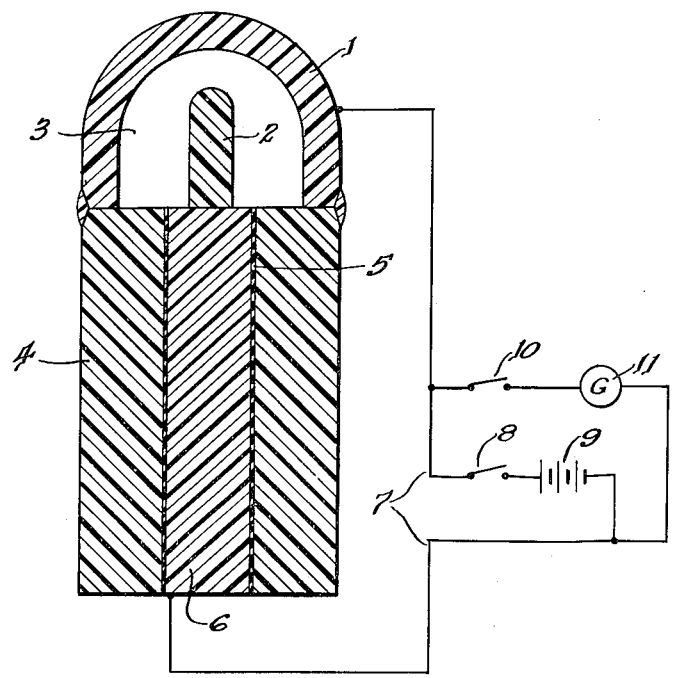

3,005,794
METHOD OF USING AND MANUFACTURING PLASTIC EQUIVALENT TO ORGANIC MATERIALS
Francis R. Shonka, Riverside, and John Ernest Rose, Elmhurst, Ill., and Gioacchino Failla, New York, N.Y., assignors to the United States of America as represented by the United States Atomic Energy Commission
Filed Aug. 8, 1958, Ser. No. 754,112
3 Claims. (Cl. 260—37)

The present invention relates to an apparatus for determining the amount of radiation absorbed in passing through a material in which a substitute substance replaces the material under investigation. This substitution is essential in the determination of radiation absorption of material whose properties do not lend themselves to the ordinary methods of determination.

The invention also includes a process for making such substitute substances.

Further the invention fully relates to and specifies the composition of a number of these substitute substances, in some cases having no appreciable interaction with neutrons and in other cases having substantially the same neutron interaction as the material whose radiation absorption is to be determined.

Finally the invention relates to a condenser in which insulator and conducting material have the same ratio of the same atoms contained, thereby eliminating some disturbing side effects, upon subjecting the condenser to radiation.

It is an object of this invention to provide an apparatus for the determination of the absorption of gamma radiation and/or neutrons in passing through a selected material, where the selected material does not have properties amenable to use in conventional apparatus, or where such use entails great inconvenience.

It is particularly the object of this invention to provide an apparatus for the determination of the amount of radiation absorbed in passing through animal tissue and through bone.

It is also the object of this invention to furnish a method of producing substitute substances, having superior properties, for the determination of radiation absorption by a wide variety of materials over the materials themselves.

It is the object of this invention to provide these substitute substances for determining the radiation absorption of a wide variety of materials, not capable of readily being used for direct determination of such absorption. These substances have excellent physical properties, since they are electrically conducting, strong, impact resistant, impervious to gas, substantially nonvolatile and highly stable to temperature change and to decomposition. They are also amenable to conventional fabrication methods including moulding and machining.

This apparatus is very useful in estimating the effects of radiation on various substances, particularly from body tissues, since these effects depend very largely on the energy absorbed from the radiation.

There are many other uses for the substitute materials, particularly in stduying biological effects of radiation.

As is well known the absorption of gamma radiation in any material takes place by three major mechanisms, each having major effectiveness at certain energy ranges. These processes are usually described by the terms "Compton effect," "photoelectric effect," and "pair production." There is a brief description of the mechanism of these processes on page 166 ff. in "Introduction to Radiochemistry," Friedlander and Kennedy, Wiley & Sons, 1949. The mechanism in absorbing radiation of low energy is primarily the photoelectric effect. This mechanism persists, but becomes less important in the intermediate energy range, where the Compton reaction becomes effective. In the high end of the energy spectrum, pair production becomes the predominant mechanism of absorption.

At least in the atoms of low atomic number, herein limited to less than atomic number 20, all electrons participate in the Compton effect for electromagnetic radiation of the energy of interest. Hence any substitute substance must contain the same number of electrons as that of the material whose Compton absorption of energy must be duplicated.

Each atom of a particular element has a cross section for absorption of electromagnetic radiation by photoelectric effect, which varies with the energy of the radiation over a fairly wide range. Data is available for a number of elements at several radiation energies in "X-ray Attenuation Coefficients from 10 Kev to 100 MEV" by Gladys White Grodstein, National Bureau of Standards Circular 583 (1957). In order to have a substitute substance having the same photoelectric effect as another material, it is necessary to choose an intermediate energy level for the radiation at which the photoelectric effect is to be equalized, in order that errors at other energy levels will be minimized. Two substances or materials have an equal Compton effect at a given energy, when the sum of the products of the number of atoms of each element in a chemical formula for that substance, empirical or true, each number multiplied by the cross section for Compton absorption at the chosen energy, the sum divided by the molecular weight implied by the formula, are equal. This sum of electrons and sum of weighted cross sections for Compton effect are here defined as electrons per atomic weight unit and photoelectric effect per atomic weight unit.

Pair production absorption of radiation is effective at radiation energies greater than 1.02 MEV., and its effect is proportional to the square of the atomic number of the target atom. Hence, in making substitute substances it is necessary to limit substitution of atoms of low atomic mass, not too far from that of the substituted atom. The absorption properties of substitute substances and original material are not in as close agreement in the pair production radiation energy region as they are in the lower energy regions. However, they are satisfactory for many purposes.

A common method for determining absorption of radiation is by measurements of the number of ion pairs produced by such radiation. These may be measured in air, for example, by collecting the ions in a given volume of air, to determine their total charge. In order to measure the true absorption in a material, however, the radiation must reach it in equilibrium. Equilibrium is attained in a substance when the ratio of ion density to primary radiation beam intensity becomes constant. Each substance or material has a characteristic length of path for radiation of a given energy at which equilibrium is reached. In order to measure radiation absorption of a substance the incoming radiation must be in equilibrium with that substance.

In order to be able to utilize the well known ionization chamber for such absorption measurements, it is necessary for the radiation to pass through a sufficient thickness of the material under investigation that equilibrium is reached, and pass into the gas equivalent of the material, where ion pairs are formed. The gas equivalent is a mixture of gases having identical proportions of identical atoms as is found in the material whose absorptive properties are to be measured. If the gas volume is known, the ion pairs produced show the absorption of the energy of the radiation in the mass of material.

In an ionization chamber, using the loss of charge from a condenser as a means of measuring ion pairs, it is highly desirable that the material whose absorption is to be determined, be electrically conducting and serve as an electrode to receive the ions. Further, it should be nonvolatile in whole or in part so as not to contaminate the gas equivalent with moisture or its own vapors. This is not the case with animal muscle tissue, a material of great present importance in its radiation absorption properties.

Obviously, improvements in strength, impact resistance, imperviousness to the gas equivalent, as well as stability to temperature change and decomposition are highly desirable in an instrument for a number of such determinations over a period of time. The instability of animal tissue is very well known, to illustrate an outstanding need for the teachings of this invention.

In this application materials refer to compositions of matter whose radiation absorption properties are sought; substances refer to their substitutes for the purpose of finding these properties. The term "materials" specifically includes animal muscle tissue and bone.

Secondary radiation is radiation produced in a substance on absorbing primary radiation. Interaction with neutrons includes all types of interaction. Absorption of radiation includes loss of a part of the energy of the radiation as well as total annihilation of the radiation.

Materials having different compositions while having the same elements in the same proportions are defined as those in which the modes of chemical combination are at least in part different.

Suitable pastics for making our composition include polystyrene, polyethylene, nylon and Teflon. The particular polystyrene, polyethylene, nylon, Teflon which we used are defined by their manufacturer, serial designation and empirical chemical formula shown below.

TABLE I

| Materials | Manufacturer | Chemical Composition |
|---|---|---|
| Polystyrene P1X5 | Monsanto | $(CH)_x$* |
| Polyethylene Alathon HD | du Pont | $(CH_2)_x$* |
| Nylon-Zytel 61 (a polyamide) | du Pont | $(C_6H_{11x}NO)$* |
| Teflon-T30 (a polyfluoroethylene) | du Pont | $(CF_2)_x$* |

*$x$ is a digit sufficiently large to give a solid polymeric compound.

Oil furnace black is a product of burning oil in an oxygen deficient flame and consists primarily of carbon. The grade used consists of particles having a size of approximately 30 m$\mu$.

Animal muscle is defined as

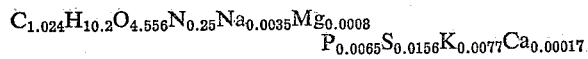

$$C_{1.024}H_{10.2}O_{4.556}N_{0.25}Na_{0.0035}Mg_{0.0008}$$
$$P_{0.0065}S_{0.0156}K_{0.0077}Ca_{0.0017}$$

This is the composition accepted as a standard for wet muscle by the International Commission of Radiological Units designated hereafter as ICRU; (Report of the International Committee on Radiation Units and Measurements, National Bureau of Standards Handbook 62, p. 12 (1956).) Animal bone is defined by the same committee as $C_{2.316}H_{6.40}O_{2.563}N_{0.193}Mg_{0.0082}P_{0.2258}S_{0.0063}Ca_{0.3668}$ calculated from the percentages of each element shown therein.

The drawing shows a vertical sectional view of the apparatus for determining the radiation absorption of a material, at any given radiation energy over a wide range, in which there is used a substitute substance, having superior properties over the original material for such a determination.

A first or outer electrode 1 is made of this substitute material, 2 is a second or inner electrode made of the same material. A chamber 3 separates these electrodes. The substitute material of the electrodes 1 and 2 is electrically conducting. In the first electrode it is used in sufficient thickness, varying with the composition of the substance and with the energy of the X-rays, in such way that it is at least thick enough for the radiation to reach equilibrium on passing completely through it. In practice it is made thick enough such that equilibrium can be reached with radiation having the highest energy of interest. The chamber is filled with the gas equivalent. The volume of the chamber must be known to a high degree of accuracy.

A cylindrical layer 4 of a second conducting substance is secured and sealed to the outer electrode 1. Both substances being electrically conducting, electrical continuity is maintained. The outer diameter of the electrode 1 is approximately equal to that of the layer 4. The inner diameter may vary over moderately wide limits. An insulator 5, a few mils thick, fits closely the inner diameter of the layer 4. The materials of the layer and insulator contain the same elements in the same ratio, but are different in composition. An inner member 6 of material identical with that of the outer layer 4, fits snugly into insulator 5, effectively filling the remaining space therein. The inner electrode 2 is conductively attached to the inner member 6 at its top. The outer layer 4, the insulator 5, and the inner member 6 constitute an electrical condenser having superior properties under irradiation, since to the radiation the same number and proportion of elements exist throughout this condenser.

Electrical leads 7 are taken from the inner member 6 of the condenser and some point on the assembly of outer electrode 1 and outer condenser layer 4. One of the leads 7 connects through a single pole switch 8 with a battery 9, capable of placing a desired charge on the condenser by way of the second lead 7. A second single pole switch 10 connects with a voltmeter or other suitable device 11 again to the second lead 7. By making this latter connection the charge of the condenser may be determined.

A radiation source of known energy and intensity, not shown, passes radiation through electrode 1, the radiation reaching equilibrium within the electrode. The radiation causes ion pairs to form in the gas equivalent in the chamber 3, partly discharging the previously charged condenser. The energy absorbed per unit of weight in the substance under investigation is readily determined from the time and intensity of radiation, the known composition, volume and pressure of the gas equivalent, capacity of the electrical system of condenser and electrode and the loss of charge of the system.

In accordance with this invention an analysis is made of the material preferably organic material to be simulated to determine the type and proportion of atoms present. A synthetic plastic or mixture of synthetic plastic with finely divided carbon is then selected to provide the carbon, nitrogen and hydrogen atoms present in the organic material, as well as part of the oxygen atoms present. Certain particles, in part materials, preferably calcium fluoride and/or silica are added to compensate for the oxygen deficiency and the deficiencies of other atoms, if present. Additional carbon is needed in a quantity sufficient to render the resultant composition conducting.

These various ingredients are in proportion such as to provide the same number of electrons per atomic weight unit, and the same photoelectric effect at a predetermined radiation energy per atomic weight unit as is present in the material whose absorption properties are to be determined. A suitable specimen is prepared from the composition by conventional fabrication methods for plastics, moulding and machining. The specimen is made so that radiation reaches equilibrium within the specimen. This specimen is irradiated with gamma radiation of the energy of interest while one surface is in contact with the gas equivalent of the material under investigation. The gamma radiation causes ion pairs to be released in the gas equivalent. These ion pairs are counted by suitable means, such as discharge of plates connected to an electrical condenser. By simple calculations, the absorption of radiation per unit weight of the material is then determined.

In preparing the substitute substance, it has been found that 10 to 18½% of carbon in a plastic mixture is necessary to obtain the desired conductivity. It has also been found that this carbon must have a very small particle size, approximately one-tenth of the range of photoelectrons produced in the compound mixture by passage of soft X-rays through it.

This large carbon content is much higher than found in many materials whose radiation absorbing properties are to be determined. There is no problem in replacing an identical amount of hydrogen when it is contained in the material to be replaced. In animal tissues the nitrogen content is small. This can be put into the composition by adding nylon. However, many materials of interest contain substantial amounts of oxygen. This has been found very difficult to incorporate into a plastic-carbon substitute substance and still retain conductivity and desirable physical properties. It has been found that silica and/or calcium fluoride, which contain only elements of low atomic number, can substitute for the effects of oxygen if added in proper amounts.

Basically the calculation of the proportions of the various constituents of the substitute material consists of insuring that the substitute substance and the material have the same number of electrons per atomic weight unit, as well as the same average photoelectron production cross section at a predetermined radiation energy level again on an atomic weight unit basis. The first condition assures that the Compton effect will be identical, the second that the photoelectric effect will be the same at the chosen radiation energy level, with reasonable deviations at other energy levels.

If it is desired that the substitute substance have identical response to neutrons a further limitation is necessary. Then it is necessary to insure that the average neutron interaction per atom is the same as in the material whose radiation absorption is to be determined.

Finally, another condition may be found desirable, that of producing a substance identical to the original material in response to the effects of passing gamma radiation through it and still be comparatively insensitive to the passage of neutrons. In such case the formulation must be completely free of hydrogen. Compounding Teflon, which contains only carbon and fluorine, with oil furnace black has been found to produce such a substance.

In compounding the inorganic particles carbon, silica and calcium fluoride a restriction of particle size is required. It is necessary that the particle be of a size less than one-tenth of the range of the photoelectric electrons produced in the particles when they are subjected to irradiation by a soft X-ray. Oil furnace black is a preferred form of the carbon particles.

The plastics Teflon, polystyrene, polyethylene and nylon must be well mixed with each other and the solid particles extremely well dispersed therein. This requires much more intensive mixing than is usually given plastic mixtures. The product substance can then be moulded to the desired shape and machined if necessary. The products in most cases have excellent physical properties in that they are strong and resist substantial impact without breaking. They are completely nonvolatile to the degree required for use in an ionization chamber. They do not decay or dehydrate in contrast to many of the substances that they simulate.

In this way a series of compositions have been made to simulate muscle tissue, bone tissue, and polystyrene in their reaction towards neutrons and gamma radiation over a very wide energy range preferably of about 10 kev. to 20 mev. Further, a substance has been prepared that simulates the action of gamma rays towards animal muscle tissue and has no reaction towards neutrons. A substance has been prepared that is equivalent to air in its reaction to gamma energy only. This is very useful in measuring the Roentgen. These are shown in the following examples.

Example I

A mixture of 13.5% by weight of oil furnace black, 52.1% polyethylene, 28.22% nylon, 2.2% silica, and 4.0% calcium fluoride was blended and compression molded. The empirical formula for the resultant substance can be shown as $C_{6.35}H_{10.2}O_{0.325}N_{0.250}F_{0.102}Si_{0.0373}Ca_{0.05116}$. It is to be noted that this contains the identical number of electrons per atomic weight unit as is found in the natural muscle tissue as defined by ICRU. On multiplying each atom with its cross section in barns for photoelectric absorption for 30 kev. gamma radiation and adding, both for the substance and for ICRU muscle tissue, we find substantially the same number on dividing by the molecular weights of the empirical formulas used. This number is again in terms of the atomic weight unit. A comparison of the response of the tissue equivalent muscle above with that of ICRU defined natural muscle is shown in the following table. This comparison is limited to the total photoelectric absorption coefficient, expressed as barns per "molecule" where the barn is defined as an area of $10^{-24}$ cm.$^2$. TE is an abbreviation for tissue-equivalent, the simulating substance of this invention.

TABLE II

TOTAL PHOTOELECTRIC ABSORPTION COEFFICIENT
[Barns per "molecule"]

| Energy—kev | 20 | 30 | 40 | 50 |
|---|---|---|---|---|
| ICRU-muscle | 89.070 | 23.91 | 9.12 | 4.32 |
| TE-muscle | 85.78 | 23.91 | 9.41 | 4.58 |
| Ratio TE-muscle/ICRU-muscle | 0.963 | 1 | 1.032 | 1.060 |
| Error rel. to TE-muscle, percent | −3.7 | 0 | 3.2 | 6.0 |

The errors in Table II are for photoelectric absorption coefficient $\tau$. However, the Compton absorption $\sigma_a$ is appreciable at these energies, hence the total errors will be less than those in Table II; for example, at 50 kev. the total error will be less than 3%. This error is still further reduced by the second order effect, due to the absorption of the scattered (coherent and incoherent) radiation.

Table III shows the errors for photoelectric absorption and pair production in TE-muscle relative to ICRU-muscle. Similar calculations for solid carbon and for a commercially available electrically conducting TE-muscle, whose chemical composition by weight is given as carbon 86.5%, hydrogen 10%, and nitrogen 3.5%

$$(C_{7.23}H_{9.96}N_{0.25})$$

have been made and are included.

TABLE III

|  | Photoelectric Absorption | | | | Pair Production | | | |
|---|---|---|---|---|---|---|---|---|
| Mev | 0.020 | 0.030 | 0.040 | 0.050 | 3 | 5 | 10 | 20 |
| TE-muscle, percent | −3.7 | 0 | 3.2 | 6.0 | −14 | −13.5 | −13.5 | −12.2 |
| Carbon | −60 | −62 | −62 | −62 | −8.2 | −7.4 | −7 | −7 |
| Commercial muscle-equiv | −66 | −68 | −68 | −68 | −21 | −20 | −20 | −19.5 |

Example II 43.87% carbon and 56.13% Teflon were blended and molded into a specimen electrode for the measurement of comparative absorption of gamma radiation only. This material, because of the absence of hydrogen, was relatively free from interaction with neutrons. The mechanical properties were anything but ideal in that it was difficult to mold and somewhat brittle. However, it was very much superior to graphite in every respect. Measurements of the errors relative to ICRU-muscle for photoelectric and pair production over the energy band 10 kev. to 20 mev. Carbon which is sometimes used for this purpose is shown for comparison.

into a specimen for measuring absorption of gamma photons. This material had the empirical formula $$C_{1.369}H_{1.777}N_{.1615}O_{.2978}Si_{.0682}$$

This substance was equivalent to air in its absorption of gamma radiation by photoelectric effects in the range of 10 kev. to 50 kev. and by pair production in the range of 3 to 20 mev. The following table shows the errors of

TABLE IV

|  | Photoelectric Absorption | | | | | Pair Production | | | |
| --- | --- | --- | --- | --- | --- | --- | --- | --- | --- |
| Mev | 0.010 | 0.030 | 0.030 | 0.040 | 0.050 | 3 | 5 | 10 | 20 |
| TE-muscle insensitive to neutrons, percent | 0.25 | −0.75 | −2.4 | −2.5 | −2.7 | 3.9 | 5.7 | 5.5 | 5.3 |
| Carbon | −69 | −60 | −62 | −62 | −62 | −8.2 | −7.4 | −7 | −7 |

*Example III*

A mixture of 14.0 wt. percent of oil furnace black, 21.6% nylon, 30.0% polyethylene, and 34.4% calcium fluoride was blended and molded into a specimen electrode for radiation absorption measurements. The resultant composition has the empirical formula $$C_{4.49}H_{6.4}N_{0.193}O_{0.193}F_{0.8911}Ca_{0.4456}$$

The following table lists the errors for the photoelectric absorption at low energies and the total pair production absorption at high energies as compared with the ICRU bone composition. This covers the energy band from 10 kev. to 20 mev. It is to be noted that the errors for the synthetic bone tissue are smaller than that for synthetic muscle tissue since bone contains 14.7% calcium and the simulating material contains 17.6%.

TABLE V

|  | Photoelectric Absorption | | | | | Pair Production | | | |
| --- | --- | --- | --- | --- | --- | --- | --- | --- | --- |
| Mev | 0.010 | 0.020 | 0.030 | 0.040 | 0.050 | 3 | 5 | 10 | 20 |
| TE-bone, percent | −1.1 | 0.4 | 0.9 | 1.5 | 2.1 | 3.3 | −6.0 | −6.1 | −6.1 |

*Example IV*

A mixture of 72% polystyrene, 15.1% polyethylene and 12.9% oil furnace black, all percentages by weight, was blended and formed by molding into a specimen for measuring the radiation response relative to polystyrene. Since this composition is identical empirically in formula with that of true polystyrene the response was closely identical with results from the true substance over a wide energy band. In addition, this compound avoids certain transition effects which are apparent with gamma radiation and neutrons. Since polystyrene is the usual choice for the insulating parts of an ionization chamber, this material is useful for determining polystyrene absorption of radiation.

*Example V*

A mixture of 17.69 wt. percent of oil furnace black, 67.23% nylon, and 15.08% silica was blended and formed this air equivalent plastic as compared to air in the energy range cited above. This material is valuable as a standard air replacement in the measuring of the Roentgen.

TABLE VI

|  | Photoelectric Absorption | | | | | Pair Production | | | |
| --- | --- | --- | --- | --- | --- | --- | --- | --- | --- |
| Mev | 0.010 | 0.020 | 0.030 | 0.040 | 0.050 | 3 | 5 | 10 | 20 |
| Air Eq., percent | −3.6 | 0 | 0.5 | 1.6 | 2.8 | −12.5 | −13.0 | −13.1 | −13.2 |

It will be understood that this invention is not to be limited to the details given herein but that it may be modified within the scope of the appended claims. In particular it is not limited to the compositions of the examples since the teachings illustrate a general method for preparing substitute substances having identical radiation absorption properties with a wide range of materials.

What is claimed is:

1. A stable composition of matter having the radiation response of animal muscle tissue in a radiation measuring instrument consisting of a mixture of 52.1% polyethylene plastic, 28.2% polyamide plastic, 13.5% oil furnace black, 2.2% silica and 4.0% $CaF_2$.

2. A stable composition of matter having the radiation response of bone in a radiation measuring instrument consisting of a mixture of 30% polyethylene plastic, 21.6% polyamide plastic, 14% oil furnace black and 34.4% $CaF_2$.

3. A stable composition of matter having the radiation response of air in a radiation measuring instrument consisting of a mixture of 67.23% polyamide plastic, 17.69% oil furnace black and 15.08% silica.

References Cited in the file of this patent

UNITED STATES PATENTS

| | | |
| --- | --- | --- |
| 2,491,320 | Koontz | Dec. 13, 1949 |
| 2,536,991 | Wollan et al. | Jan. 2, 1951 |
| 2,577,978 | Nicholls et al. | Dec. 11, 1951 |
| 2,596,080 | Raper et al. | May 6, 1952 |
| 2,849,414 | Stott | Aug. 26, 1958 |
| 2,884,534 | Fearon et al. | Apr. 28, 1959 |